Jan. 31, 1939.  S. M. BÄCKSTRÖM  2,145,678
VEHICLE COOLER USING ENGINE FUEL AS REFRIGERANT
Filed May 7, 1936   3 Sheets-Sheet 1
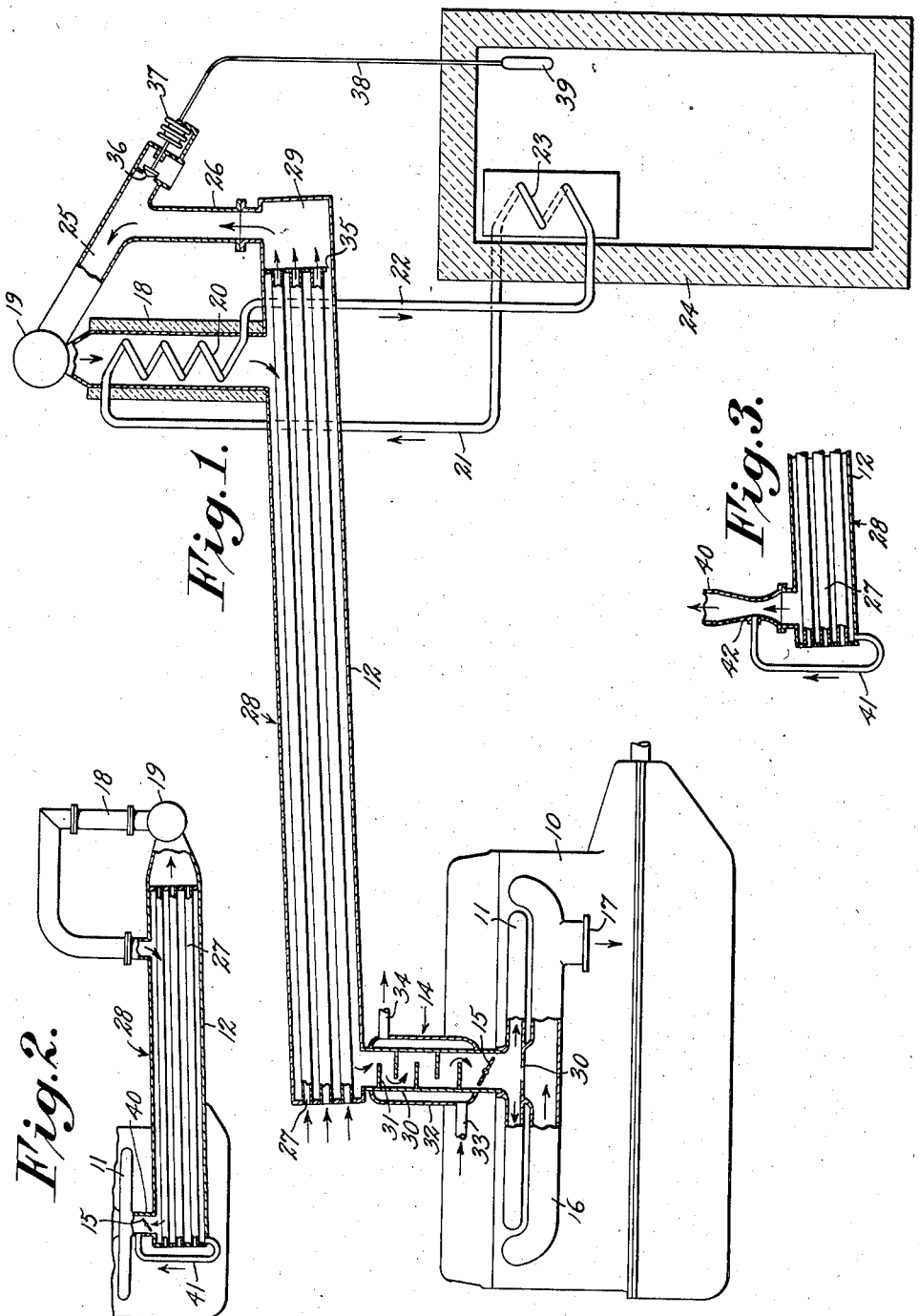
INVENTOR.
Sigurd Mattias Bäckström
BY
D. E. Heath
his ATTORNEY.

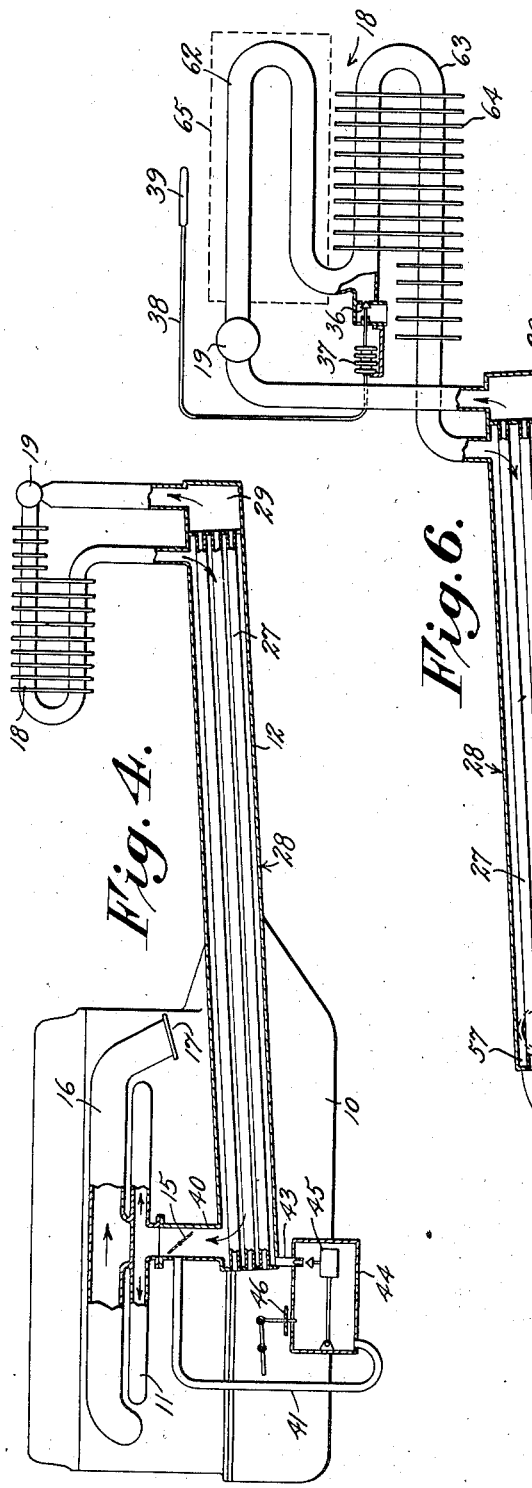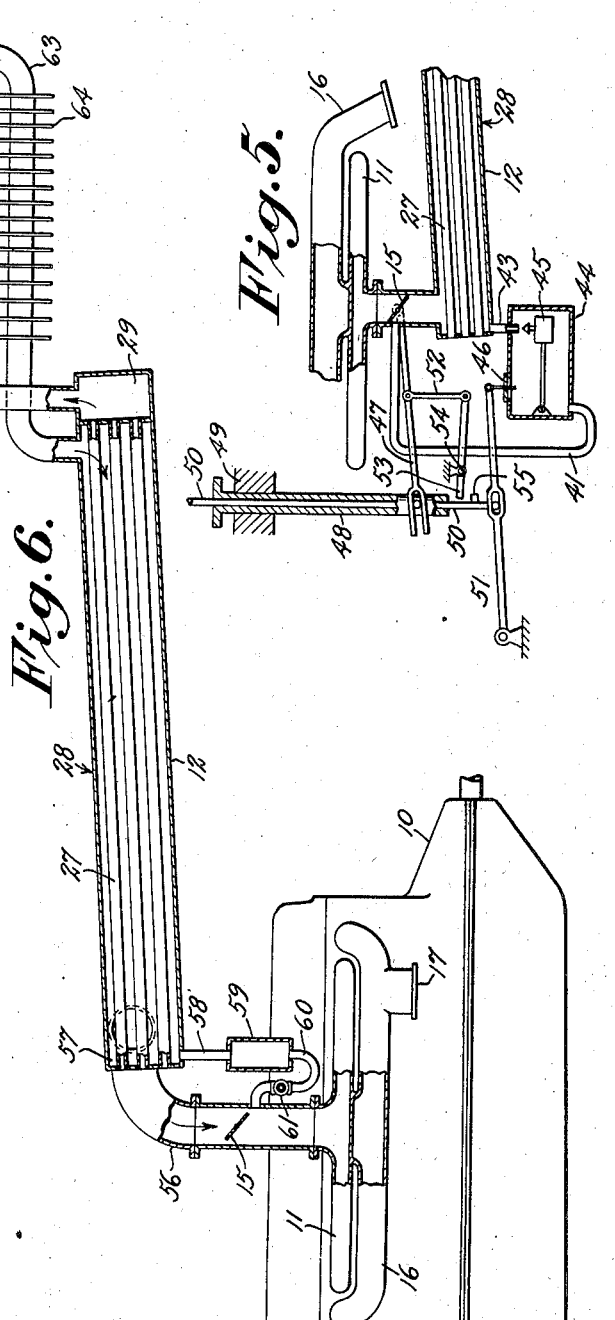

Jan. 31, 1939. S. M. BÄCKSTRÖM 2,145,678
VEHICLE COOLER USING ENGINE FUEL AS REFRIGERANT
Filed May 7, 1936 3 Sheets-Sheet 3
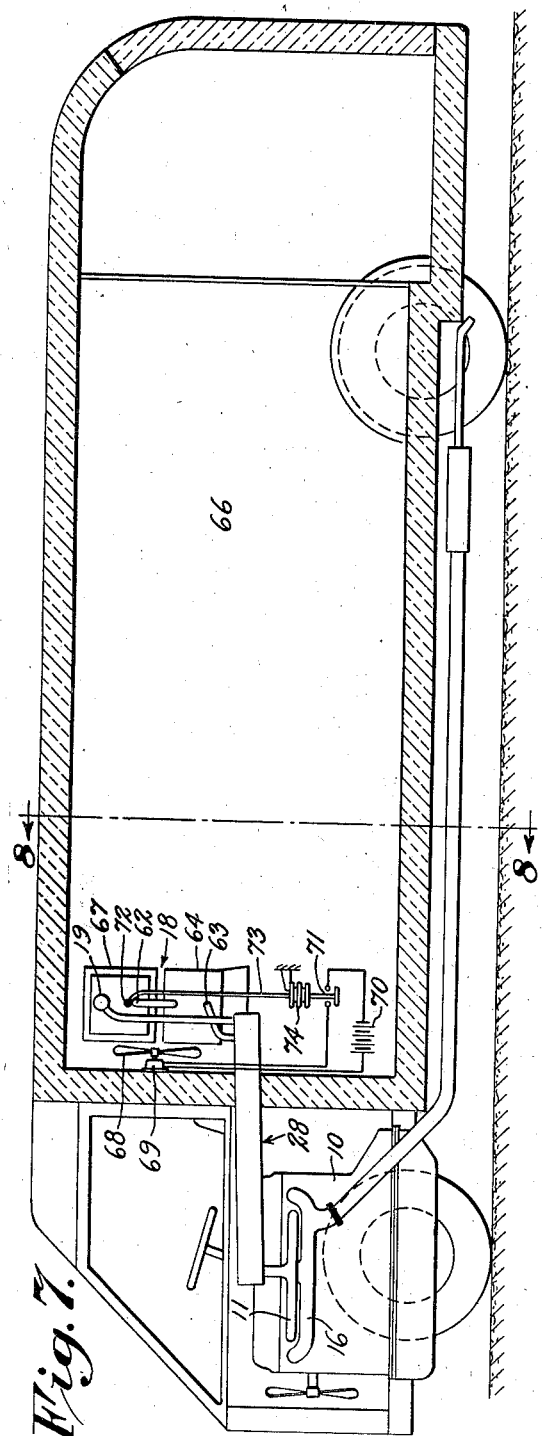
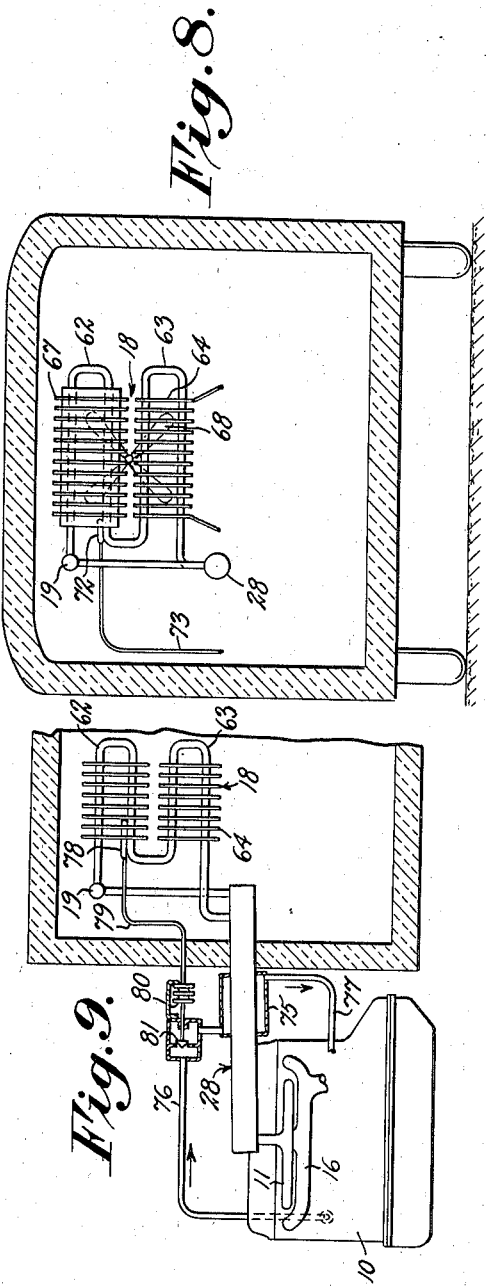
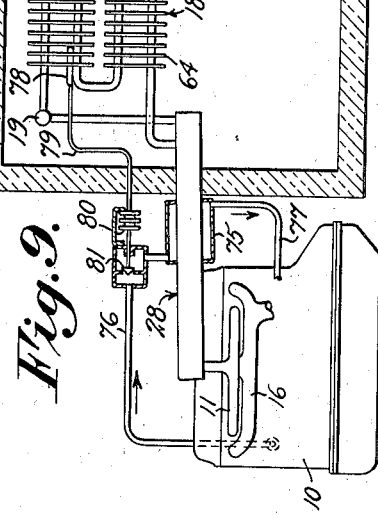
INVENTOR.
Sigurd Mattias Bäckström
BY
J. E. Heath
his ATTORNEY.

Patented Jan. 31, 1939

2,145,678

UNITED STATES PATENT OFFICE 2,145,678

VEHICLE COOLER USING ENGINE FUEL AS REFRIGERANT

Sigurd Mattias Bäckström, Stockholm, Sweden, assignor, by mesne assignments, to Servel, Inc., New York, N. Y., a corporation of Delaware Application May 7, 1936, Serial No. 78,357
In Germany May 16, 1935

25 Claims. (Cl. 62—169)

My invention relates to a method of and apparatus for producing refrigeration in connection with internal combustion engines which are either stationary or employed for driving or propelling automobiles, motor boats, motor railways, or the like.

It has been proposed to produce refrigeration in connection with internal combustion engines wherein the expansion of fluid fuel is utilized to produce cold, and the fuel is subsequently introduced into the engine.

The object of my invention is to improve the operation of internal combustion engines when such engines form a part of a refrigeration system.

Another object of my invention is to provide a system for producing refrigeration in connection with internal combustion engines whereby several temperature ranges of useful cold are obtained.

A further object of my invention is to provide a system for producing refrigeration in connection with internal combustion engines whereby the amount of cold produced is controlled so that a refrigerator compartment or enclosed space is maintained at a substantially uniform temperature and at the same time the evaporation of fuel supplied to the engine is assured.

Further objects and advantages of my invention will become apparent as the following description proceeds, and the various features of novelty which characterize my invention are pointed out with particularity in the claims forming a part of this specification.

In the accompanying drawings Fig. 1 is a diagrammatic illustration of an embodiment of my invention for an internal combustion engine shown in connection with a refrigeration system, the supply duct for the fuel being disposed above the intake manifold of the engine;

Figs. 2 and 3, and 4 and 5 are modifications of the embodiment shown in Fig. 1 with the supply duct for the fuel disposed below the intake manifold of the engine;

Fig. 6 is another modification of the embodiment shown in Fig. 1 with the supply duct for the fuel disposed above the intake manifold of the engine;

Fig. 7 is a further modification of the embodiment illustrated in Fig. 6 shown in connection with a motor vehicle;

Fig. 8 is a view taken at line 8—8 of Fig. 7 to illustrate parts of the refrigeration system more clearly; and Fig. 9 is a modification of the embodiment shown in Fig. 7.

Referring to Fig. 1 of the drawings, a cylinder block 10 of an internal combustion engine such as, for example, for a motor vehicle, is provided with an intake manifold 11. The combustible mixture of air and fuel flows to the suction inlet of the manifold 11 through a supply pipe or duct 12 and heating device 14, and is delivered in the usual manner to the cylinders. The quantity of the combustible mixture drawn into the cylinders may be controlled by a throttle or regulating valve 15 located at the suction inlet of the manifold 11, whereby the speed of the engine can be regulated. An exhaust manifold 16, which is in close heat exchange relation with the intake manifold 11, is provided with an outlet 17 to which the usual exhaust pipe may be connected for conducting the exhaust gases from the engine.

A well insulated vaporization chamber or conduit 18 is arranged between a carburetor 19 and duct 12 and forms, with the connecting member or duct 12, part of the combustible gas passage leading to the intake manifold 11. The chamber 18 serves for the production of cold and within it is disposed a coil 20 connected by conduits 21 and 22 to a second coil 23 which is located within the compartment of a refrigerator cabinet 24. The coils 20 and 23 and connecting conduits 21 and 22 form a closed system which is filled with a fluid that absorbs heat from the refrigerator cabinet 24 and transfers this heat to the chamber 18 where the heat produces evaporation of the fuel for the engine. This fluid, which may be termed an auxiliary fluid, may evaporate in the coil 23 and condense in the coil 20.

Air to provide the combustible mixture may be supplied to the carburetor 19 through conduits 25 and 26 and tubes 27 which are arranged within the duct 12 and are open at one end to the atmosphere. The tubes 27 and duct 12 form a heat exchange device 28 having an open space 29 at the upper end which communicates with the conduit 26. During normal operation of the engine the fuel, which is conducted from a suitable source of supply (not shown) and which may consist of liquid benzene or gasoline or a mixture thereof, for example, is atomized in the carburetor 19 and passes in a finely divided state into the vaporization chamber 18 together with air supplied from the atmosphere.

The pressure within the chamber 18 is below that of atmosphere because of the suction produced by the engine, and this reduced pressure causes evaporation of the fluid particles. Due to this evaportion of the fluid particles heat is taken up from the surroundings, and, since the vaporization chamber 18 is well insulated, this heat can only be withdrawn from the coil 20. Complete evaporation of the fuel particles is not obtained in the vaporization chamber 18, however, because the withdrawal of heat from the coil 20 effects the production of cold and lowers the temperature of this coil and the auxiliary fluid therein. The quantity of fuel that does not evaporate is dependent upon the low temperature of the coil 20 and the auxiliary fluid therein. This failure to obtain complete evaporation of the fluid particles is especially true of the constituent parts of the fuel which volatilize with difficulty and which gradually reach the duct 12.

The temperature in the duct 12 is higher than that in the vaporization chamber 18 on account of the heat exchange effected with the incoming fresh air flowing through the tubes 27. Due to this higher temperature in the duct 12, further evaporation of the fluid particles, including those constituent parts of the fuel which are less volatile and do not evaporate in the chamber 18, takes place relatively rapidly and cools the incoming fresh air. The cooling of the incoming fresh air in the heat exchanger 28 is of considerable importance for the production of useful cold and, in order to make this as complete as possible, the heat exchanger should preferably be so constructed that it will have relatively large surfaces to transfer heat to the fuel and reduce the temperature of the incoming air. Since in the field of application of my invention, such as in automobiles, for example, practical reasons will hardly permit the provision of a heat exchanger which is relatively large in all dimensions, it necessarily results that the relatively large surfaces desired must be obtained by making the heat exchanger 28 relatively long and also small in cross section with narrow passages for the fresh air and fuel mixture. With this construction of the heat exchanger 28, liquid particles in the fuel mixture tend to collect and accumulate on the surfaces of the duct 12 and the tubes 27. The liquid particles include the products of the fuel mixture which volatilize only with difficulty, such as, for example, the products and residues of the fuel which do not evaporate at the temperature prevailing in the heat exchanger 28. These products and residues of the fuel may be relatively thick and viscous, and when a sufficient quantity of such liquid accumulates in the duct 12, the free flow of the fuel mixture to the engine is prevented. This is especially true when the engine is operating at its idling speed, at which speed a large quantity of fuel may also accumulate in the duct 12.

Further, the air forming part of the fuel mixture usually contains water vapor which under certain circumstances may condense in the evaporization chamber 18 and heat exchanger 28. The water condensed from the air mixes with the products that do not volatilize easily, and the resulting mixture which may be greasy tends to prevent further the free flow of the combustible fuel mixture into the engine. After the engine has been running at a normal operating speed and then caused to run at its idling speed, the accumulation of such liquid causes the engine to become sluggish in operation and may even cause the engine to stop completely because of the failure of the fuel to ignite in the engine.

In accordance with my invention the accumulation of liquid fuel in the heat exchanger 28 is prevented during normal operation of the engine so that the operation of the engine is not disturbed when the speed of the engine is reduced to its idling speed. In the embodiment of my invention shown in Fig. 1 I accomplish this by arranging the heat exchanger 28 in an inclined position so that liquid fuel will readily flow from the vaporization chamber 18 and sloping or inclined duct 12 toward the intake manifold 11. At the lower end of the duct 12 is provided the heating device 14 to effect substantially complete evaporation of any liquid which has not been evaporated in the vaporization chamber 18 and duct 12. This heating device may comprise a pipe 30 having distributing plates 31 arranged therein over which the liquid flows. The pipe 30 is provided with an outer enclosing shell 32 having an inlet and outlet 33 and 34, respectively, through which a suitable heating medium may flow, such as the exhaust gases from the engine or the heated water from the cylinder block 10. The plates 31 distribute and separate the liquid which is effectively heated and converted into a gaseous state by reason of the high temperature of the heating medium flowing through the shell 32. In the event that any of the liquid is not evaporated in the heating device 14, the evaporation of such liquid will take place immediately upon striking the surface portions of the intake manifold 11 adjacent the suction inlet so that for all practical purposes the fuel entering the cylinder is substantially a mixture of air and vaporized fuel and substantially free of liquid.

In the cooling of the incoming fresh air effected in the heat exchanger 28, water vapor in such air may be condensed in the conduits 25 and 26 and in the space 29 at the upper end of the heat exchanger. In order to prevent the accumulation of such water in the space 29, a drain opening 35 is provided adjacent the upper ends of the tubes 27. The drain opening 35 is made small enough or otherwise constructed and arranged to be sealed by liquid to permit only the water to flow into the duct 12 and heating device 14 where it is evaporated and mixes with the combustible mixture.

Under most operating conditions the throttle or regulating valve 15 is preferably so adjusted that it assumes almost but not quite a closed position when it is desired to operate the engine at its idling speed, at which speed the minimum quantity of the fuel mixture is permitted to flow into the engine. In automobiles of the type now generally in use a large quantity of fuel will be stored in the fuel supply passage, namely, the heat exchanger 28, the vaporization chamber 18 and carburetor 19, during normal operation of the engine. When the regulating valve 15 is subsequently moved to its closed position to operate the engine at its idling speed, the composition of the fuel introduced into the engine is changed in an undesirable manner and becomes richer in fuel than is desired. Further, liquid fuel will flow into the intake manifold 11 and may even enter the cylinders of the engine and either disturb or completely prevent the ignition in the cylinders, with the engine operating at its idling speed, because of the lack of air in the fuel mixture.

Such failure of ignition readily occurs when an automobile is driven up-grade with the regulating valve 15 open and the engine operating at high power, and thereafter the automobile is driven down-grade with the regulating valve in its closed position and the engine operating at its idling speed. At the conclusion of the up-grade drive a large quantity of fuel is distributed over the surfaces of the heat exchanger 28 on account of the high rate of flow of the fuel mixture. When driving down-grade with the regulating valve 15 adjusted to operate the engine at its idling speed, the large quantity of fuel collects in the narrow gas passage at the lower end of the heat exchanger 28. In many instances the large quantity of fuel collecting in this manner may be sufficiently great to form a liquid column. With the changed inclination of the heat exchanger 28 when driving down-grade, the liquid fuel in the lower narrow portion of the heat exchanger and elsewhere may, under certain conditions, enter the intake manifold 11 and even the cylinder, as mentioned above.

In many instances where the accumulation of fuel is not so great, disturbances in the operation of the engine can occur for other reasons. For example, the liquid fuel may collect at the regulating valve 15, particularly when it is in its closed or idling position, so that the fuel supply passage is sealed at this point. When this occurs the operation of the engine in response to the regulating valve is rendered inoperative and the engine becomes sluggish in operation.

By inclining the heat exchanger 28 and providing the heating device 14, the large quantity of liquid fuel that accumulates when the engine is running at high power is evaporated in the heating device so that substantially only a mixture of air and vaporized fuel is introduced into the engine when the engine is subsequently caused to operate at its idling speed. Further, the sluggish operation of the engine in response to the regulating valve 15, caused by the accumulation of fuel on the surfaces of the heat exchanger 28 in the fuel supply duct, is reduced and is substantially negligible by preventing the accumulation of a large quantity of liquid fuel about the regulating valve 15.

In the embodiment just described, it may be stated that the dimensions of the heat exchanger 28 should preferably be such that at full power of the engine the passages in the duct 12 are kept practicaly empty and substantially free from any large accumulation of fuel so that only a small quantity of fuel is stored in the duct 12 upon adjustment of the regulating valve 15 to the idling speed of the engine. Attention must also be given to the angle of inclination of the heat exchanger 28. Although the heat exchanger can be arranged in a substantially vertical position or at a decided angle of inclination, it is always necessary in such instances to provide for a uniform control of the flow of the fuel. In most instances, as in motor vehicles, for example, the angle of inclination of the heat exchanger is not very great for structural reasons.

In order to control the temperature mantained in the compartment of the refrigerator cabinet 24, suitable mechanism is provided for regulating the amount of fresh air which is admitted into the conduit 25 and mixes with fresh air that has passed through the heat exchanger 28. Such mechanism may comprise a valve 36 which is arranged at the lower open end of conduit 25 and connected to an expansible bellows 37. The bellows 37 is connected by a capillary tube 38 to a thermostat 39 positioned within the refrigerator cabinet 24. The belows 37, capillary tube 38 and thermostat 39 constitute what is termed an expansible fluid thermostat which is filled with a suitable fluid that increases in volume with an increase in temperature and becomes reduced in volume with a decrease in temperature. As long as the temperature within the refrigerator cabinet is at or above a predetermined temperature, the valve 36 will remain in its closed position and all of the air supplied to the carburetor 19 passes through the heat exchanger 28. When the cabinet 24 tends to fall below the predetermined temperature, the reduction in volume of the fluid within the bellows 37 will cause the latter to contract and move the valve 36 to an open position, so that a portion of the air supplied to the carburetor 19 passes directly from the atmosphere into conduit 25. When the cabinet 24 is again at the predetemined temperature, the expansion of the fluid within the bellows 37 will cause the latter to expand and move the valve to its closed position. If desired, the production of cold in the compartment of the refrigerator cabinet 24 may be reduced by maintaining the valve 36 open in any suitable manner, and supplying all of the air to the carburetor 19 directly from the atmosphere into conduit 25 without first passing through the heat exchanger 28.

In Fig. 2 is illustrated a modification of the refrigeration apparatus shown in Fig. 1 and differs therefrom in that the lower end of the downward extending heat exchanged 28 is disposed below the suction inlet of the intake manifold 11 and connected therewith by an upward extending conduit 40 within which is arranged the regulating valve 15. In order to prevent liquid fuel form collecting in the gas passage at the lower end of the duct 12, a pipe 41 is provided having its lower end connected to the duct 12 and its upper end connected to the conduit 40 at a point above the regulating valve 15. When the regulating valve 15 is in its open position the suction pressure in the lower end of the duct 12 and in the pipe 41 is substantially the same so that the liquid remains in the lower portion of the pipe 41 and lower end of the duct 12. As the regulating valve 15 is moved to its closed position the suction pressure produced by the engine decreases in the duct 12 and increases in the pipe 41 whereby liquid fuel is drawn upward through the pipe 41 and delivered to the vertical conduit 40 in an atomized condition.

In order to increase the rate of flow of liquid fuel through the pipe 41, the conduit 40 may be provided with a narrowed portion in the form of a venturi, as indicated at 42 in Fig. 3. During normal operation of the engine with substantially a mixture of air and vaporized fuel being drawn upward through the conduit 40, there results a lowering of pressure at the throat of the venturi, so that liquid fuel is effectively drawn up through the pipe 41 from the heat exchanger 28 and admitted in an atomized condition into the conduit 40. The atomized liquid fuel admitted into the main gas passage mixes with the combustible fuel mixture and is evaporated when it contacts the highly heated surface of the intake manifold 11. When the regulating valve 15 is moved to its closed position the suction pressure in the pipe 41 increases and, when the valve reaches its closed position and the engine is operating at its idling speed, substantially only a mixture of vaporized fuel is introduced into the engine.

Instead of continuously removing liquid fuel from the lower end of the heat exchanger 28, as just described, this liquid fuel may be stored and subsequently used for accelerating the engine. Such an embodiment is shown in Figs. 4 and 5 wherein a pipe 43 depending from the lower end of the heat exchanger 28 communicates with a storing receptacle 44 having a float valve 45 arranged therein. The receptacle 44 is provided with a valve 46 whereby the fuel stored in the receptacle 44 may, if desired, be open to the atmosphere. The pipe 41 for withdrawing liquid fuel from the receptacle 44 has its lower end connected to the bottom of the receptacle and its upper end connected to the conduit 40 at a point which is below the regulating valve 15 when it is moved to its closed position. It should be remembered, as stated above, that in its so-called closed position the regulating valve still permits the flow of a small quantity of air and vaporized fuel to the engine whereby the latter will operate at its idling speed. When the regulating valve 15 is moved to its closed position to operate the engine at its idling speed, the fuel collected in the receptacle 44 can be prevented from being drawn upward through the pipe 41 by maintaining the valve 46 closed. To this end the valves 15 and 46 may be connected in any suitable manner whereby the valve 46 is closed when the regulating valve is moved to its closed position. The liquid remains in the receptacle 44 because, with the valves 15 and 46 in their closed positions, the liquid in the pipe 41 and in the receptacle 44 are subjected to the same suction pressure produced by the engine. In this connection it should be noted that the float valve 45 will be open during the intervals of time when the engine is operating at its idling speed because, if the quantity of liquid fuel in the receptacle 44 is sufficient to close the float valve 45 and the valve 46 is closed, the suction pressure in the pipe 41 will be effective to withdraw fuel from the receptacle until the float valve 45 opens.

One manner of connecting the valves 15 and 46 is diagrammatically shown in Fig. 5, although it should be understood that this is merely illustrative and that other connecting means may be provided. In Fig. 5 the regulating valve 15 is controlled by a lever 47 which is rigidly connected at one end to the valve 15 and pivotally connected at its opposite end to a tubular member 48 which extends through and frictionally engages an opening in a suitable support 49. The frictional engagement of the member 48 and opening is such that the member 48 can readily be moved through the opening and yet will remain in any position to which it is moved. A rod 50 extends through the tubular member 48 and is in frictional engagement therewith, and the lower end thereof is pivotally connected to the lever 51 of the valve 46. The frictional engagement of the rod 50 and the tubular member is such that the rod will move with any movement of the tubular member and yet is independently movable without affecting the position of the tubular member. It will therefore be seen that both of the valves 15 and 46 can be moved to their closed positions by moving the rod 50 and tubular member 48 downward.

After the engine has been operating at its idling speed with the valves 15 and 46 in their closed positions and it is desired to utilize the liquid fuel in the receptacle 44 to accelerate the engine, the valve 46 may be opened by moving the rod 50 upward through the tubular member. Since the pressure on the liquid in the receptacle is now atmospheric and the pressure on the liquid in the lower end of the pipe 41 is the reduced suction pressure produced by the engine, the liquid will be drawn upward through the pipe 41 and admitted into the conduit 40 in a finely divided condition. This finely divided fuel is evaporated upon striking the heated surface of the intake manifold 11 and then delivered to the cylinders of the engine. It will therefore be seen that the receptacle 44, float valve 45, valve 46 and pipe 41 comprise an acceleration pump which can be effectively employed to use stored quantities of liquid fuel that collect in the heat exchanger 28.

When the regulating valve 15 is moved from its closed or idling position to an open position it is also desirable to effect a temporary opening of the valve 46 so that, in addition to the mixture of air and vaporized fuel supplied to the engine through the duct 12 and conduit 40, fuel from the receptacle 44 is also supplied to the engine through the pipe 41 to increase the acceleration of the engine. This may be effected by providing a lever 52 which is pivotally connected at its upper end to the lever 47 at a point intermediate its ends, and which is pivotally connected at its lower end to the end of an arm 53. When the tubular member 48 is initially raised to move the regulating valve 15 to its open position, the rod 50 is also moved upward to open the valve 46. With such movement the arm 53 pivots about the point 54 and the outer end thereof strikes an abutment 55 on the rod. With further upward movement of the tubular member 48 the arm 53 causes the rod 50 to move downward and close the valve 46. The temporary opening of the valve 46 may also be effected in any other suitable manner so that, after the first initial movement of the valve 15 to its open position, the valve 46 will immediately close even though further movement of the regulating valve 15 is not made.

In Fig. 6 is illustrated a modification wherein the lower end of the heat exchanger 28 is disposed above the suction inlet of the intake manifold 11 and connected therewith by a conduit 56. In order to prevent liquid fuel that collects in the duct 12 from passing directly through the conduit 56 to the engine, the upper end of this conduit only communicates with the top portion of the gas passage in the duct, as indicated at 57 in Fig. 6, to provide a barrier to the flow of liquid. The liquid fuel that accumulates at the lower end of the duct 12 flows by gravity through a pipe 58 into a receptacle 59 where it may be temporarily stored. A pipe 60 having one end connected to the conduit 56 and the opposite end connected to the lower end of the receptacle 59 is provided for conducting liquid from the receptacle to the conduit 56 in a finely divided state, and the flow of fuel may be controlled by a valve 61. The fuel stored in the receptacle 59 can be effectively utilized for supplying additional fuel to the engine, particularly in starting.

It has previously been stated that the evaporation of the fluid particles takes place for all practical purposes in two stages, namely, in the vaporization chamber and in the heat exchanger, the cold produced in the former or first stage being utilized as useful cold and the cold produced in the latter or second stage being used for cooling incoming fresh air. The evaporation in two stages is due to the fact that it takes place in air, which is an inert gas, and also to the fact that the fuel generally consists of several substances which at a given temperature have different vapor pressures. In the vaporization chamber a lower temperature than that obtained in the heat exchanger is produced, because in this portion of the gas passage the volatile substances or products of lower boiling point evaporate. In the heat exchanger the voatile products of higher boiling point evaporate.

In accordance with my invention the evaporation of the fuel at different temperatures may be effectively utilized to produce useful cold in several stages. Such an arrangement is shown in the embodiment illustrated in Fig. 6 wherein the vaporization chamber 18 comprises a pipe coil having two parts 62 and 63 to provide two ranges or stages of useful cold. The lower temperature prevails in the part 62 of the coil, and a somewhat higher temperature prevails in the part 63 of the coil which is provided with plates or fins 64 so that the heat transfer to this portion of the vaporization chamber is more readily effected. Instead of transferring heat from a refrigerator cabinet through a closed fluid circuit to the vaporization chamber, as shown in Fig. 1 and described above, the two parts 62 and 63 of the coil may comprise an evaporator to which the heat is directly transferred by conduction through the coil. The part 62 of the evaporator coil may, for example, be used for the production of ice within a receptacle indicated diagrammatically at 65; and the part 63 of the evaporator coil may be used for cooling an enclosed space or compartment, such as, for example, the interior of a refrigerator cabinet. The products of the fuel having a lower boiling point evaporate in the part 62 of the evaporator coil so that very low temperatures can be obtained in this stage for the production of ice. Although lower temperatures are obtained in the part 62 of the evaporator coil, the quantity of cold produced is comparatively small because the products which vaporize easily form a small part of the fuel.

In Fig. 6 the two parts 62 and 63 of the evaporator coil are connected in series relation, although, if desired, they may be connected in parallel. Where more than two stages of refrigeration are provided, the several parts of the evaporator coil may be connected to provide a combination series and parallel arrangement.

The valve 36 is arranged between the two parts 62 and 63 of the evaporator coil to control the quantity of fresh air that is admitted directly into the part 63 and is mixed with fuel and air that has passed through the heat exchanger 28. In this manner the cold produced by the part 63 of the evaporator coil can be effectively controlled to maintain substantially constant the temperature within a compartment or enclosed space, the thermostat 39 being positioned within such space and responsive to a temperature condition affected by the evaporator coil or cooling element. Where it is desired to control the generation of cold in the part 62 as well as in the part 63 of the evaporator coil, an additional valve may be provided at a point ahead of the evaporator or vaporization chamber 18, in a manner similar to that shown in Fig. 1.

In utilizing refrigeration apparatus of the character described in the different embodiments, it is highly desirable that the production of cold will not become dependent upon the operation of the engine. In instances where an engine is operated for several hours, the amount of cold produced may become so great that too low a temperature is obtained in the space being cooled and in other parts of the apparatus. Further, the low temperature of the vaporization chamber reduces the rate of evaporation of the fuel with the result that the fuel required for the operation of the engine may not completely evaporate and thereby disturb the operation of the engine. In other instances, where the engine is not operating or a vehicle is being driven down-grade with the regulating valve in its closed or idling position, the amount of cold produced may become too low or become reduced to a negligible value, so that the space being cooled will soon reach an abnormally high temperature.

In the practical utilization of the refrigeration apparatus described above, therefore, it is desirable to compensate for variations or fluctuations in the amount of cold produced so that the temperature in the space being cooled is maintained substantially constant, and that the various parts of the engine, such as the valves, are protected from reaching an abnormally low temperature.

Such a practical arrangement of my invention is shown in Figs. 7 and 8 wherein a motor vehicle having an enclosed space 66 to be cooled is provided with refrigeration apparatus in connection with the engine 10, which is similar to that shown in Fig. 6. The carburetor 19 is positioned at the forward end and near the top of the enclosed space 66 so that the mixture of fuel and air will be conducted downward through the two parts 62 and 63 of the evaporator coil 18 to the heat exchanger 28. The heat exchanger 28 is arranged in an inclined position with the lower end thereof communicating with the suction inlet of the intake manifold 11. In order to prevent the introduction of liquid fuel into the engine, either the heating device 14 shown in Fig. 1, or the conduit 56 and storing receptacle 59 shown in Fig. 6, may be employed as a part of the connection between the heat exchanger 28 and the intake manifold 11.

The part 62 of the evaporator coil 18 may be used for producing ice in the receptacle 65, and such ice can be stored and utilized for cooling the enclosed space 66 when the engine is not operating. To increase the effectiveness of such space cooling the ice receptacle 65 may be provided with a plurality of plates or fins 67 for removing heat from the air. By positioning the evaporator coil 18 near the top of the enclosed space 66 to cool air flowing over the surfaces of the receptacle 65 and fins 67, the cooled air flows downward by gravity influence and causes an upward flow of warmer air whereby the air is effectively cooled and the temperature within the space 66 is prevented from reaching an abnormally high value.

In order to avoid sluggish operation of the engine and effect sufficient evaporation of the fuel in the evaporator coil 18 when a low temperature prevails in the part 62, a fan 68 is arranged adjacent the evaporator coil for circulating relatively warm air in the enclosed space 66 over the surfaces of the part 63 and fins 64 secured thereto. The fan 68 is driven by an electric motor 69 which is connected to a suitable source of supply indicated at 70, such as, for example, the storage battery of the motor vehicle. The operation of the fan 68 may be controlled automatically by providing an expansible fluid thermostat to control a relay 71 in the circuit of the motor 69. As shown, a thermostat 72 is arranged in thermal contact with the part 62 of the evaporator coil and connected by a capillary tube 73 to the expansible bellows 74 which is operative to open and close the contacts of the relay 71. When the temperature of the part 62 of the evaporator coil 18 is such that sufficient vaporization of the fuel therein is effected, the fluid within the bellows maintains the latter sufficiently expanded to keep the relay 71 open and the motor 69 de-energized. When the temperature of the part 62 of the evaporator coil 18 reaches an abnormally low value that prevents sufficient vaporization of the fuel, the fluid within the bellows 74 becomes reduced in volume and causes the latter to contract. With such contraction of the bellows 74 the relay 71 is closed to complete the electric circuit for the motor 69, and the motor drives the fan 68 and circulates relatively warm air in the enclosed space 66 over the surfaces of the part 63 of the evaporator coil and fins 64. Subsequently, when the temperature of the part 62 of the evaporator coil is such that sufficient vaporization of the fuel is effected, the expansion of the fluid within the bellows 74 will cause the latter to expand and open the contacts of the relay 71 to de-energize the motor 69.

If desired, heat can also be supplied to the heat exchanger 28 by providing an enclosing shell about the duct 12 and circulating heated water from the engine block 10 therethrough whereby cooling of the water is also effected. Such an arrangement is diagrammatically illustrated in Fig. 9 wherein an enclosing shell 75 disposed about a portion of the duct 12 is provided with an inlet and outlet to which conduits 76 and 77 are connected for circulating heated water from the cylinder block 10. An expansible fluid thermostat, similar to that shown in Fig. 8, and comprising a thermostat 78, capillary tube 79 and bellows 80, is provided to control a valve 81 in the conduit 76. The quantity of heat supplied to the heat exchanger 28 to assure complete evaporation of the fuel is controlled in response to the temperature of the part 62 of the evaporator coil in the same manner that the operation of the fan 68 is controlled in the embodiment shown in Fig. 8 and described above.

In view of the foregoing it will be seen that a refrigeration system in connection with an internal combustion engine has been provided, in which the dependable operation of the engine is assured under different operating conditions, particularly those existing when the engine is employed for driving a motor vehicle. Although several embodiments of my invention have been shown and described, it will be apparent to those skilled in the art that changes can be readily made and that certain features can be used independently of others without departing from the spirit and scope of my invention. Further, it will also be apparent that my invention can be employed in connection with internal combustion engines where there is a tendency for liquid fuel to collect in the supply duct under certain operating conditions. I therefore aim in the appended claims to cover all such changes and modifications as fall within the true scope of my invention.

What I claim is:

1. Refrigeration apparatus including an internal combustion engine, a cooling member, means including a downwardly inclined heat exchanger for supplying air to said cooling member, means for supplying fuel to said cooling member, means including said heat exchanger for conducting combustible mixture from said cooling member to said engine and for cooling the air, adjustable means in said conducting means for controlling the combustible mixture introduced into said engine, means for removing from said combustible mixture liquid that collects and flows downwardly in said heat exchanger, and means for converting removed liquid into an atomized or gaseous state and mixing the same with the combustible mixture whereby the latter is introduced into said engine substantially free from liquid.

2. Refrigeration apparatus including an internal combustion engine, a cooling member, means including a conduit to provide a passage for supplying air to said cooling member, means for supplying fuel to said cooling member, means including a duct to provide a passage for conducting combustible mixture from said cooling member to said engine, portions of said conduit and duct being in heat exchange relation, said conduit and said duct being in communication with each other to permit water condensed in the air passage to drain and flow into the passage for the combustible mixture.

3. Refrigeration apparatus including an internal combustion engine, a cooling member, means including a downwardly inclined heat exchanger disposed above the suction inlet of said engine for supplying air to said cooling member, means for supplying fuel to said cooling member, means including said heat exchanger for conducting combustible mixture from said cooling member to said engine and for cooling the air, adjustable means in said conducting means for controlling the combustible mixture introduced into said engine, and means associated with said conducting means and interposed between the suction inlet of said engine and said heat exchanger for removing liquid from the combustible mixture at one point and introducing such liquid in an atomized or gaseous state with the combustible mixture at another point.

4. Refrigeration apparatus including an internal combustion engine, a cooling member, means including a heat exchanger for supplying air to said cooling member, means for supplying fuel to said cooling member, means including said heat exchanger for conducting combustible mixture from said cooling member to said engine and for cooling the air, means for supplying additional air to said cooling member, and means responsive to a temperature condition affected by said cooling member for controlling said last mentioned means to control the additional air supplied to said cooling member.

5. Refrigeration apparatus including in internal combustion engine, a cooling member, means for supplying fuel and air to said cooling member, means including a supply duct having a downward extending portion for conducting combustible mixture from said cooling member to said engine, a regulating valve in said duct for controlling the combustible mixture introduced into said engine, said duct having a barrier to the flow of liquid in the downward extending portion thereof, means in communication with said duct at said barrier for storing liquid, and means including a pipe for conducting liquid from said storing means to said duct at a point between said regulating valve and the inlet of said engine.

6. Refrigeration apparatus including an internal combustion engine, a cooling member, means including a heat exchanger for supplying air to said cooling member, means for supplying fuel to said cooling member, means including said heat exchanger for conducting combustible mixture from said cooling member to said engine and for cooling the air, means for supplying additional air to one part of said cooling member, and means responsive to a temperature condition affected by said cooling member for controlling said last-mentioned means to regulate the additional air supplied to one part of said cooling member.

7. A method of refrigeration with the aid of an internal combustion engine operating on liquid fuel and air, which includes admitting said liquid fuel to a region of lower pressure and supplying heat by conduction from a body to be cooled external to the path of flow of fluids supplied to said engine to cause vaporization of the fuel, introducing air to said region to form a mixture of the air and vaporized fuel, cooling such air before introduction into said region by heat transfer to said mixture, adding additional air to said mixture, and introducing said mixture into said engine.

8. Refrigeration apparatus including an internal combustion engine, a cooling member, means including a heat exchanger for supplying air to said cooling member, means for supplying fuel to said cooling member, means including said heat exchanger for conducting combustible mixture from said cooling member to said engine and for cooling air, and means for supplying additional air only to one part of said cooling member.

9. Refrigeration apparatus comprising an internal combustion engine adapted to operate on liquid fuel and a combustion supporting gas supplied thereto, a cooling element, means for supplying liquid fuel to said cooling element, means for conducting vaporized fuel from said cooling element to said engine, said cooling element being in heat transfer relation with objects to be cooled to different temperatures, an object to be cooled to the lower temperature being in heat transfer relation with a part of said cooling element in which the constituent parts of the fuel having a lower boiling point evaporate and an object to be cooled to the higher temperature being in heat transfer relation with a part of said cooling element in which the constituent parts of the fuel having a higher boiling point evaporate.

10. Refrigeration apparatus including an internal combustion engine adapted to operate on liquid fuel and a combustion supporting gas supplied thereto, a cooling element, means for supplying liquid fuel to said cooling element, means for conducting vaporized fuel from said cooling element to said engine, a first part of said cooling element being primarily in heat transfer relation with an object to be cooled to one temperature and a second part of said cooling element being in heat transfer relation primarily with an object to be cooled to a higher temperature, and means responsive to a temperature condition affected by the first part of said cooling element for controlling the rate of heat transfer effected to fuel in the second part of said cooling element.

11. Refrigeration apparatus comprising an internal combustion engine adapted to operate on liquid fuel and a combustion supporting gas supplied thereto, a cooling element, means for supplying liquid fuel to said cooling element, means for conducting vaporized fuel from said cooling element to said engine, said cooling element being in heat transfer relation with an object to be cooled to cause vaporization of the fuel, and means to increase the rate at which heat transfer is effected to fuel in said cooling element with decrease in temperature of said cooling element.

12. Refrigeration apparatus including an internal combustion engine adapted to operate on liquid fuel and a combustion supporting gas supplied thereto, a cooling element, means for supplying liquid fuel to said cooling element, means including a conduit for conducting vaporized fuel from said cooling element to said engine, means for heating said conduit, and means responsive to a temperature condition affected by said cooling element for controlling said heating means.

13. A method of refrigeration with the aid of an internal combustion engine operating on liquid fuel and the combustion supporting gas supplied thereto, which includes vaporizing said liquid fuel, supplying heat for said vaporization from a body to be cooled external to the path of fluids supplied to said engine, removing liquid from the vaporized fuel and introducing the latter into said engine, and raising the removed liquid against the force of gravity and conducting such raised liquid to a region of lower pressure in the path of flow of fluid supplied to said engine.

14. Refrigeration apparatus including an internal combustion engine operated on liquid fuel and a combustion supporting gas supplied thereto, a cooling member, means for supplying liquid fuel to said cooling member, a duct for conducting vaporized fuel from said cooling member to said engine, and means including a venturi and a conduit connected thereto for conducting liquid from one point in said duct and introducing such liquid in an atomized state in another point in said duct nearer to said engine.

15. A method of refrigeration with the aid of an internal combustion engine operating on liquid fuel and a combustion supporting gas supplied thereto, which includes admitting said liquid fuel into a region of lower pressure and supplying heat from a body to be cooled external to the path of flow of the fluids supplied to said engine to cause vaporization of the fuel, flowing vaporized fuel from said region to said engine, removing liquid from vaporized fuel at a first point in the path of flow of the latter and mixing such liquid with said vaporized fuel at a second point in the path of flow nearer to said engine, and regulating the flow of liquid from said first point to said second point.

16. A method of refrigeration with the aid of an internal combustion engine operating on liquid fuel and a combustion supporting gas supplied thereto, which includes admitting liquid fuel to a region of lower pressure and supplying heat from a body to be cooled external to the path of flow of the fluids supplied to said engine to cause vaporization of the fuel, flowing said vaporized fuel from said region to said engine, removing liquid from vaporized fuel at one point in the path of flow of the latter and at a level below the inlet of said engine, raising said liquid to a higher level, and introducing the raised liquid into the path of flow of vaporized fuel at another point nearer to the inlet of said engine.

17. Refrigeration apparatus including an internal combustion engine, a cooling member, means to supply liquid fuel to said cooling member, duct means for conducting vaporized fuel from said cooling member to said engine and for also conducting air to said engine, means including a conduit for removing liquid from vaporized fuel in one portion of said duct means and for raising said removed liquid against the force of gravity and conducting such raised liquid to another portion of said duct means through which fluid is being conducted to said engine, and means for controlling flow of liquid in said conduit.

18. Refrigeration apparatus including an internal combustion engine adapted to operate on liquid fuel and a combustion supporting gas supplied thereto, a plurality of cooling elements, means whereby liquid fuel is supplied to a first cooling element, conduit means for conducting vaporized fuel from said first cooling element to said second cooling element and from the latter to said engine, means including said conduit means whereby liquid fuel flows from said first cooling element to said second cooling element, and means whereby combustion supporting gas is admitted into said conduit means for flow through said second cooling element.

19. Refrigeration apparatus including an internal combustion engine, first and second cooling elements, conduit means for supplying air to said first cooling element, means for supplying liquid fuel to said first cooling element, duct means for conducting a mixture of air and vaporized fuel from said first cooling element through said second cooling element and thence to said engine, portions of said duct means and conduit means being in heat exchange relation for cooling air supplied through said conduit means to said first cooling element, said second cooling element being arranged in said duct means to receive liquid flowing from said first cooling element, and means whereby air, other than that cooled in said conduit means, is admitted into said second cooling element and into the presence of liquid flowing from said first cooling element.

20. Refrigeration apparatus including an internal combustion engine, a cooling member, a conduit for supplying air to said cooling member, means for supplying fuel to said cooling member, means including a duct for conducting a mixture of fuel and air from said cooling member to said engine, portions of said conduit and said duct being in heat exchange relation for cooling the air supplied through said conduit, and means for adding to said mixture additional air other than that cooled in said conduit.

21. Refrigeration apparatus comprising an internal combustion engine adapted to operate on liquid fuel and a combustion supporting gas supplied thereto, a cooling element, means for supplying liquid fuel to said cooling element, conduit means for conducting vaporized fuel from said cooling element to said engine, said cooling element being in heat transfer relation with an object to be cooled to cause vaporization of fuel, structure to effect additional transfer of heat to fuel after the fuel passes through said cooling element, and means for controlling said structure.

22. Refrigeration apparatus including an internal combustion engine operated on fluids including liquid fuel and combustion supporting gas supplied thereto, duct means including a liquid trap communicating with the suction inlet of said engine, a portion of said duct means serving as a cooling element, means for supplying liquid fuel to said cooling element, said duct means providing a path of flow for vaporized fuel from said cooling element to said engine, adjustable regulating means between said liquid trap and the inlet of said engine for controlling vaporized fuel introduced into said engine, and means including a vertically extending conduit for conducting liquid against the force of gravity from said trap to a point in said duct means between said regulating means and the inlet of said engine.

23. Refrigeration apparatus including an internal combustion engine operated on fluids including liquid fuel and combustion supporting gas supplied thereto, duct means including a liquid trap communicating with the suction inlet of said engine, a portion of said duct means serving as a cooling element, means for supplying liquid fuel to said cooling element, said duct means providing a path of flow for vaporized fuel from said cooling element to said engine, an adjustable valve in said duct means between said liquid trap and the inlet of said engine for controlling vaporized fuel introduced into said engine, said duct means having a part thereof in the form of a venturi with its throat between said valve and the inlet of said engine, and means including a vertically extending conduit for conducting liquid against the force of gravity from said trap to a point in said duct means substantially at the throat of said venturi.

24. Refrigeration apparatus including an internal combustion engine operated on fluids including liquid fuel and combustion supporting gas supplied thereto, duct means including a liquid trap communicating with the suction inlet of said engine, a portion of said duct means serving as a cooling element, means for supplying liquid fuel to said cooling element, said duct means providing a path of flow for vaporized fuel from said cooling element to said engine, conduit means for conducting liquid fuel from a higher pressure region in said duct means and introducing such fuel into a lower pressure region in said duct means through which fluid is being conducted to said engine, and means for controlling flow of fuel in said conduit means.

25. Refrigeration apparatus including an internal combustion engine operated on fluids including liquid fuel and combustion supporting gas, duct means communicating with the suction inlet of said engine, a portion of said duct means serving as a cooling element, means for supplying liquid fuel to said cooling element, said duct means providing a path of flow for vaporized fuel from said cooling element to said engine, a regulating valve in said duct means for controlling flow of fluid to said engine, a receptacle having an opening and connected to said duct means for storing liquid, means including a vertically extending conduit for conducting liquid against the force of gravity from said receptacle to said duct means at a point ahead of said regulating valve relative to the direction of flow of fluid to said engine, and valve means for the receptacle opening for controlling flow of liquid in said conduit during operation of said engine from a region at atmospheric pressure in said receptacle to a region at a lower pressure in said duct means.

SIGURD MATTIAS BÄCKSTRÖM.